(12) United States Patent
Chang (10) Patent No.: US 7,980,848 B2
(45) Date of Patent: Jul. 19, 2011

(54) MOLD FOR MOLDING LENS

(75) Inventor: Keng-Ming Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 197 days.

(21) Appl. No.: 12/330,556

(22) Filed: Dec. 9, 2008

(65) Prior Publication Data

US 2009/0169669 A1  Jul. 2, 2009

(30) Foreign Application Priority Data

Dec. 29, 2007  (CN) .......................... 2007 1 0203557

(51) Int. Cl.
*B29D 11/00* (2006.01)

(52) U.S. Cl. ........ 425/412; 425/395; 425/400; 425/408; 425/808; 65/305

(58) Field of Classification Search .................. 425/406, 425/408, 411, 412, 414, 416, 423, 808, 394–395, 425/400, 403, 466–468, 470; 65/305, 323; 264/1.32

See application file for complete search history.

(56) References Cited

U.S. PATENT DOCUMENTS

| | | | | | |
|---|---|---|---|---|---|
| 3,555,606 | A | * | 1/1971 | Hedgewick | 425/556 |
| 4,531,702 | A | * | 7/1985 | Plummer | 249/64 |
| 4,698,089 | A | * | 10/1987 | Matsuzaka et al. | 65/290 |
| 4,797,144 | A | * | 1/1989 | DeMeritt et al. | 65/102 |
| 5,110,278 | A | * | 5/1992 | Tait et al. | 425/175 |
| 5,873,921 | A | * | 2/1999 | Hirota et al. | 65/25.1 |
| 7,252,495 | B2 | * | 8/2007 | Chiang | 425/195 |
| 7,255,550 | B2 | * | 8/2007 | Chiang | 425/193 |
| 2003/0056544 | A1 | * | 3/2003 | Yamanaka | 65/305 |
| 2004/0050104 | A1 | * | 3/2004 | Ghosh et al. | 65/36 |
| 2006/0269646 | A1 | * | 11/2006 | Watanabe et al. | 425/406 |
| 2007/0210466 | A1 | * | 9/2007 | Saeki et al. | 264/1.32 |
| 2007/0212438 | A1 | * | 9/2007 | Saeki et al. | 425/408 |
| 2009/0183527 | A1 | * | 7/2009 | Chang | 65/305 |

FOREIGN PATENT DOCUMENTS

| | | | |
|---|---|---|---|
| CN | 101032846 A | | 9/2007 |
| JP | 60196317 A | * | 10/1985 |
| JP | 61031321 A | * | 2/1986 |
| JP | 02120242 A | * | 5/1990 |
| JP | 02275722 A | * | 11/1990 |
| JP | 03146427 A | * | 6/1991 |
| JP | 04074724 A | * | 3/1992 |

OTHER PUBLICATIONS

Definition of "Truncated pyramidal", p. 1.*

* cited by examiner

*Primary Examiner* — Joseph S Del Sole
*Assistant Examiner* — Dimple Bodawala
(74) *Attorney, Agent, or Firm* — Clifford O. Chi (57) ABSTRACT

A mold for molding a lens includes a first mold part and a second mold part. The first mold part includes a substantially frustoconical guiding chamber defined therein, and a first molding surface in the substantially frustoconical guiding chamber. The second mold part includes a main body having a substantially frustoconical protrusion with a substantially cylindrical recess defined therein. The substantially frustoconical protrusion has a second molding surface in the substantially cylindrical recess. The substantially frustoconical protrusion is configured for inserting into and matingly engaged in the substantially frustoconical guiding chamber of the first mold part, thus aligning the first molding surface with the second molding surface.

5 Claims, 8 Drawing Sheets

MOLD FOR MOLDING LENS

CROSS REFERENCE TO RELATED APPLICATION

This application is related to commonly-assigned copending application Ser. No. 11/434,377, entitled "press-molding mold". Disclosures of the above-identified application are incorporated herein by reference.

TECHNICAL FIELD

The present invention relates to a mold for molding a lens with high concentricity.

BACKGROUND

Figure 8:
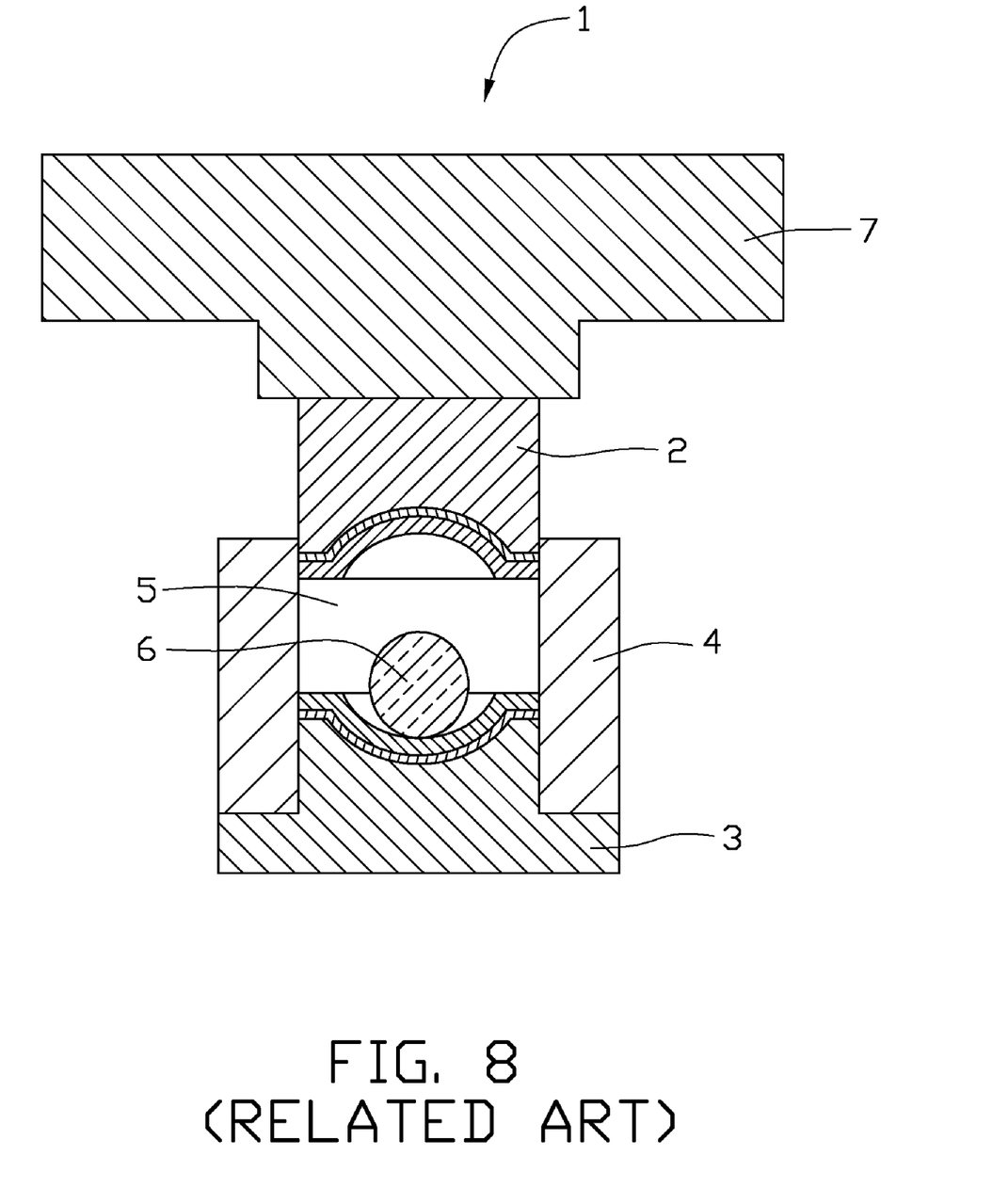
FIG. 8 is a cross-sectional view of a typical mold for molding a lens.

Molds are widely used for manufacturing optical articles, such as light guide plates, lenses, and etc. Referring to FIG. 8, a typical mold 1 includes a first mold part 2, a second mold part 3, and a bushing 4 for receiving the first mold part 2 and the second mold part 3 therein. The molding surface of the first mold part 2 and the second mold part 3, and the inner surface of the bushing 4 cooperatively define a molding chamber 5.

In a typical glass lens molding process, the second mold part 3 is inserted into the bushing 4, and then a glass preform 6 is placed on the molding surface of the second mold part 3. The first mold part 2 is then inserted into the bushing 4 to press (i.e. force the glass to a certain shape) the glass preform 6 by an oil press 7, thereby obtaining a predetermined glass lens.

However, during design or assembly, discrepancies may occur between the position of the first mold part 2 and the position of the second mold part 3, resulting corresponding discrepancies in the finished article.

Therefore, a mold that overcomes the above-described problems is desired.

BRIEF DESCRIPTION OF THE DRAWINGS

Many aspects of the present mold can be better understood with reference to the following drawings. The components in the drawings are not necessarily drawn to scale, the emphasis instead being placed upon clearly illustrating the principles of the present mold. Moreover, in the drawings, like reference numerals designate corresponding parts throughout the several views.

DETAILED DESCRIPTION OF THE EMBODIMENT

Figure 1:
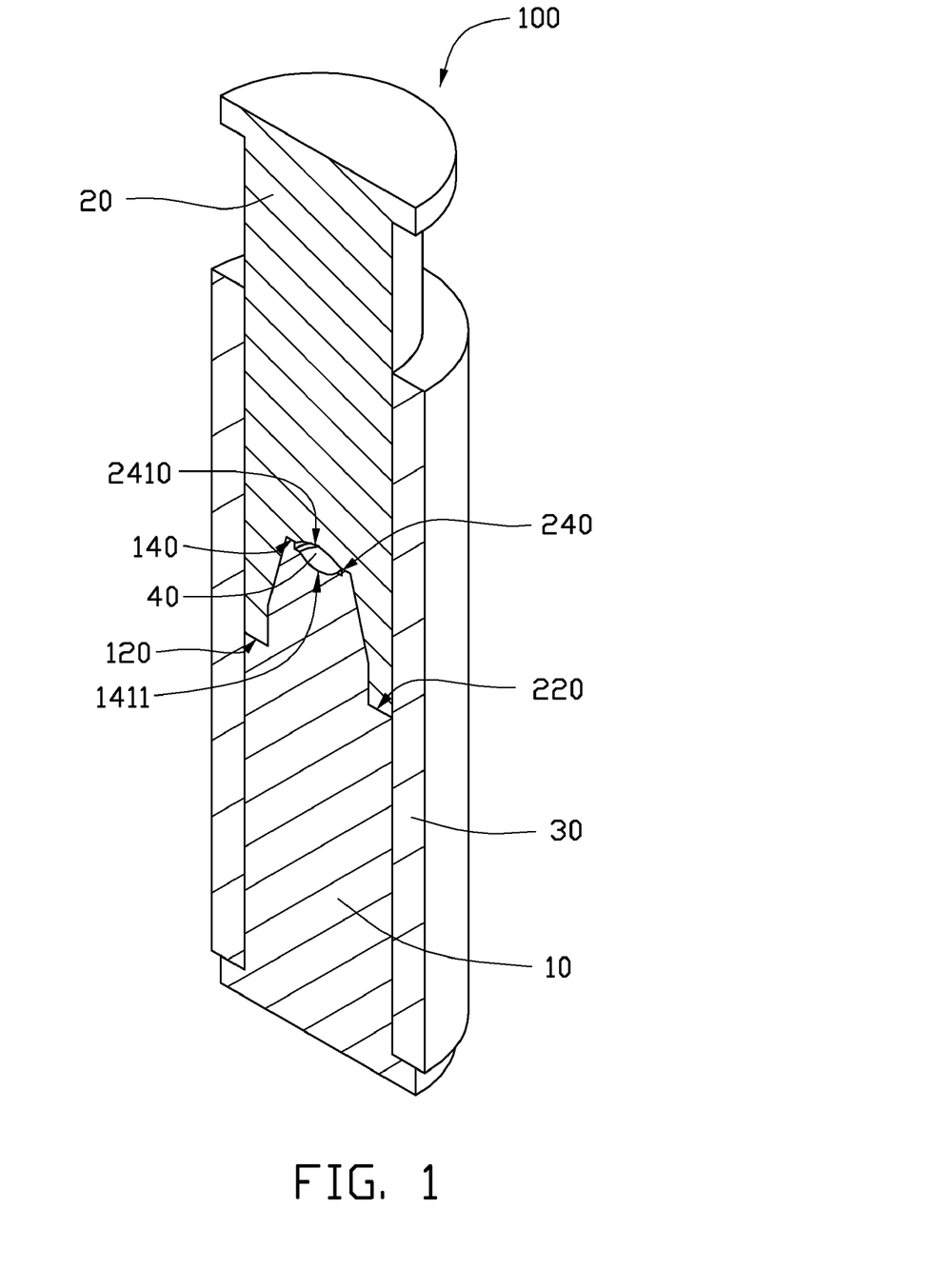
FIG. 1 is an isometric, cross-sectional view of a mold in accordance with an exemplary embodiment, the mold including a first mold part and a second mold part.

Referring to FIG. 1, a mold 100 for manufacturing optical articles, for example, optical lenses in accordance with an exemplary embodiment is shown. The mold 100 includes a first mold part 10, a second mold part 20, and a bushing 30 for receiving the first mold part 10 and the second mold part 20 therein. The first mold part 10 and the second mold part 20 are coaxially arranged in the bushing 30.

Figure 2:
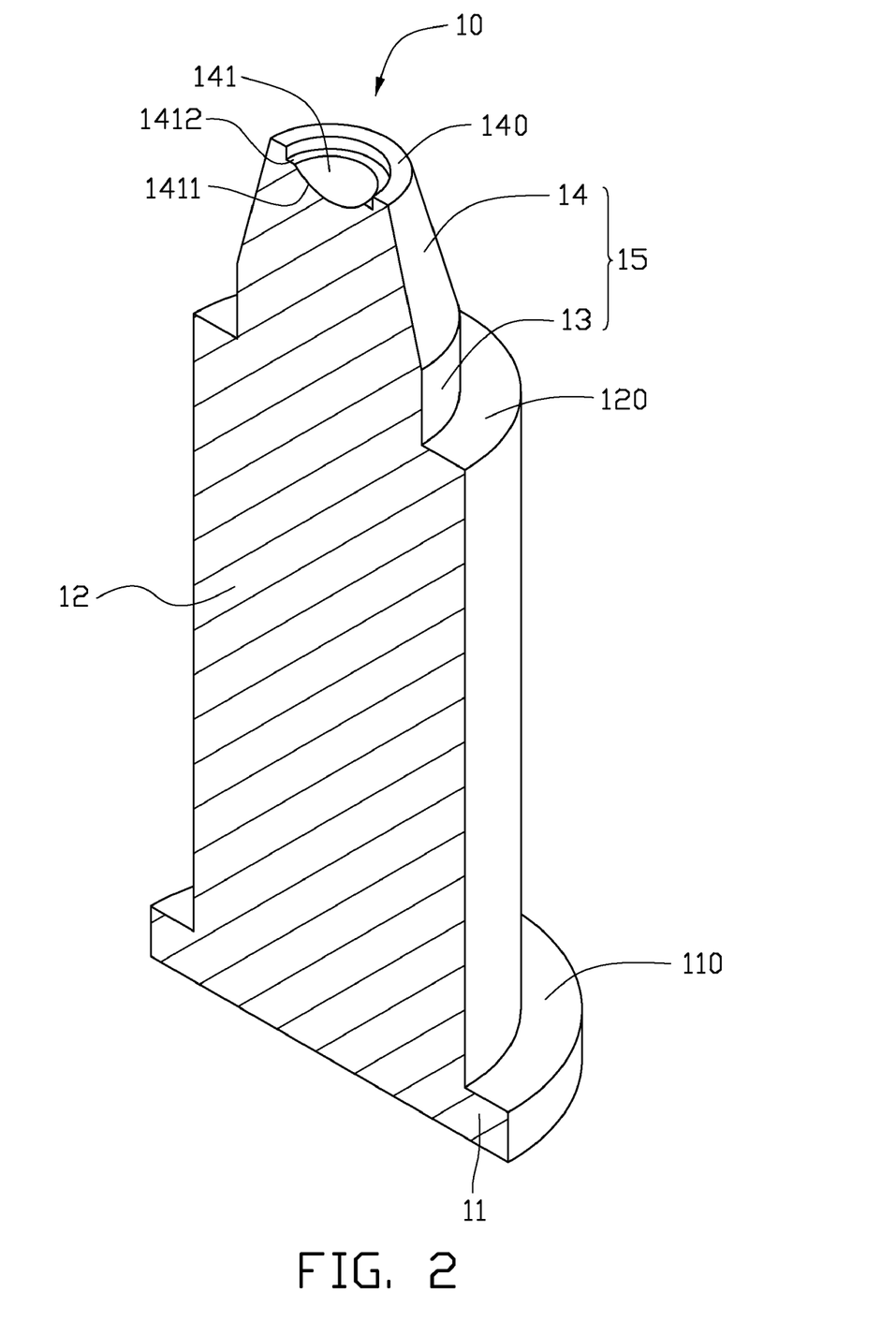
FIG. 2 is an isometric, cross-sectional view of the first mold part in FIG. 1.

Referring to FIG. 2, the first mold part 10 includes a first base 11, a first main body 12 and a first guiding portion 15. The first base 11, the first main body 12 and a first guiding portion 15 are coaxial with each other.

The first base 11 and the first main body 12 are cylinder shaped. The top surface of the first base 11 defines a first supporting surface 110. The first main body 12 is disposed on the first supporting surface 110. The diameter of the first main body 12 is smaller than the diameter of the first base 11. The first guiding portion 15 protrudes out from the end face 120 of the distal end of the first main body 12. In the present embodiment, the first guiding portion 15 includes a cylinder shaped body 13 and a frustoconical body 14 integrally formed with the cylinder shaped body 13. The body 13 is sandwiched between the main body 12 and the body 14. The top surface of the frustoconical body 14 defines a resist surface 140. A cylinder shaped recess 141 is defined in the surface 140. The bottom surface of the recess 141 includes a periphery portion 1412 and a central portion (not labeled). The bottom surface of the recess 141 defines a first molding surface 1411 in the central portion thereof. In the present embodiment, the first molding surface 1411 is an aspherical concave surface. The periphery portion 1412 of the bottom surface of the recess 141 surrounds the first molding surface 1411. Preferably, the first molding surface 1411, the first guiding portion 15, the first main body 12 and the first base 11 are coaxially joined together.

Figure 3:
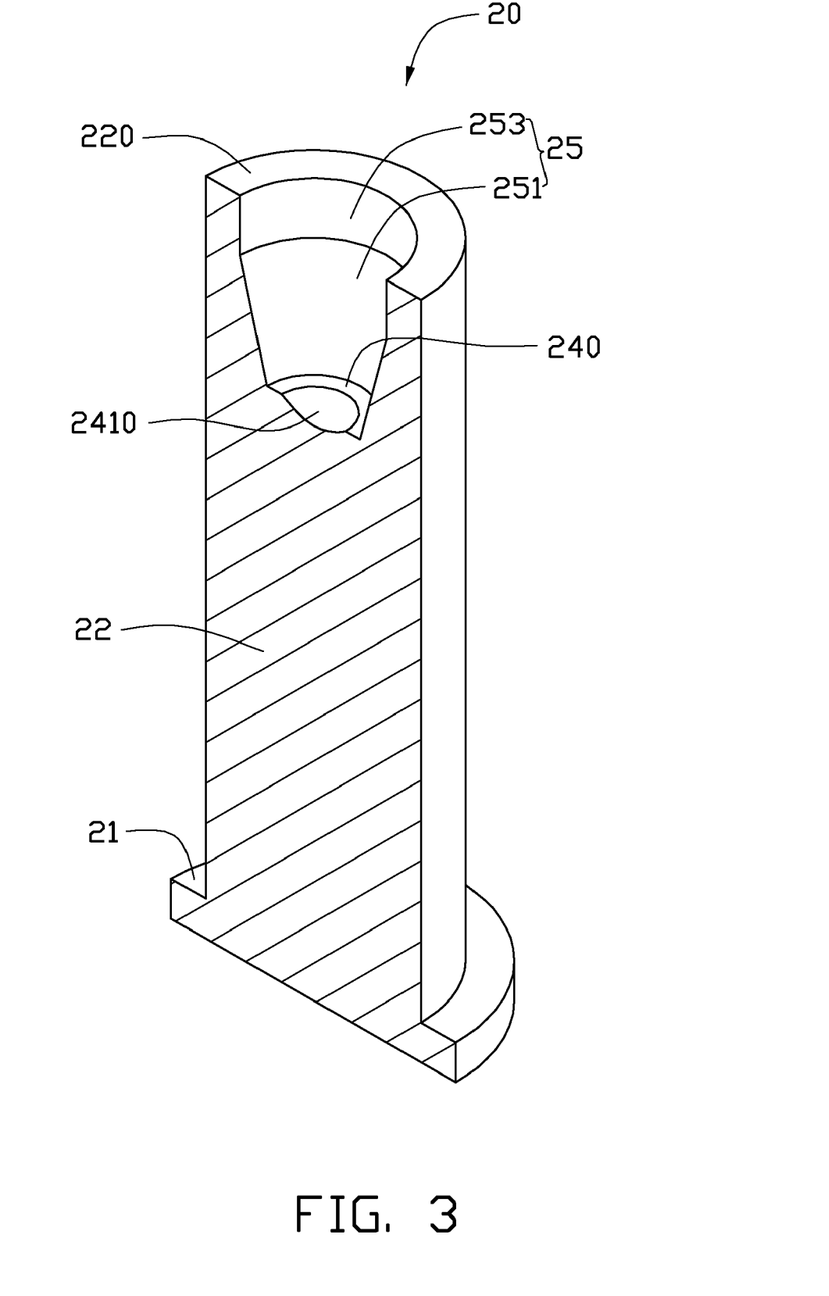
FIG. 3 is an isometric, cross-sectional view of the second mold part in FIG. 1.

Referring to FIG. 3, the second mold part 20 includes a second base 21 and a second main body 22.

The second base 21 and the second main body 22 are cylinder shaped. The second main body 22 is disposed on the base 21. The diameter of the second main body 22 is smaller than the diameter of the second base 21. The second main body 22 has an end face 220 defined at one end opposite to the second base 21 and a guiding chamber 25 defined in the end face 220. The guiding chamber 25 includes a first guiding chamber 251, and a second guiding chamber 253 closer to the end face 220 than the first guiding chamber 251. The first guiding chamber 251 communicates with the second guiding chamber 253. The largest diameter of the first guiding chamber 251 is equal to the diameter of the second guiding chamber 253. The first guiding chamber 251 is configured to be mated with the body 14 of the first guiding portion 15. The bottom surface of the guiding chamber 25 includes a periphery portion 240 and a central portion (not labeled). The bottom surface of the guiding chamber 25 defines a second molding surface 2410 spatially corresponding to the first molding surface 1411. The second guiding chamber 253 is configured to be mated with the body 13. In the present embodiment, the second molding surface is 2410 is an aspherical concave surface. The periphery portion 240 of the bottom surface of the guiding chamber 25 surrounds the second molding surface 2410. When the first guiding portion 15 inserts into the guiding chamber 25, the periphery portion 240 is wholly contacting the resist surface 140, and the inner surface of the second guiding chamber 253 is wholly contacting the outer surface of the body 13. The first molding surface 1411 and the second molding surface 2410 cooperatively define a molding chamber 40 therebetween.

It is understood that, the body 14 of the first guiding portion 15 can be truncated pyramidal shaped. The body 13 of the first guiding portion 15 can be prism shaped.

An optical article such as a glass lens may be manufactured by the mold 100 by following process.

Figure 4:
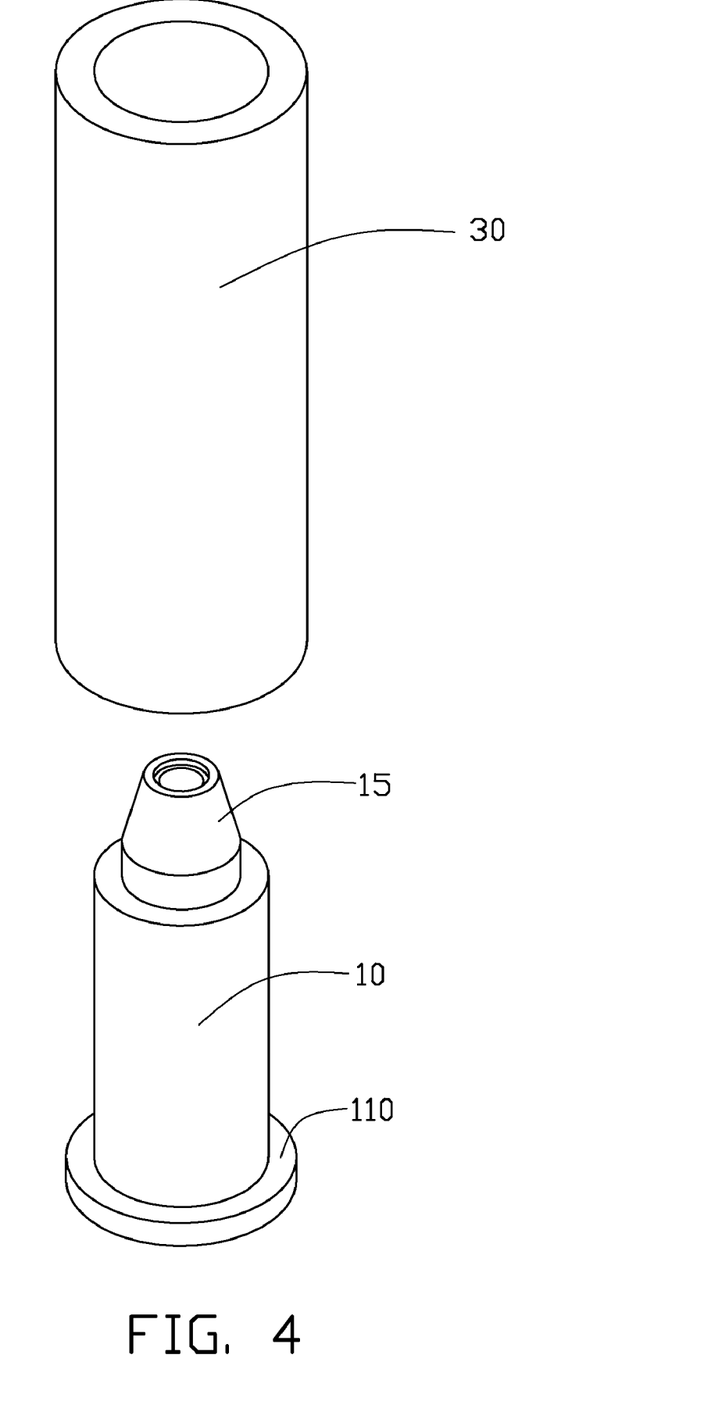
FIGS. 4-7 illustrate a process of molding a lens by the mold in FIG. 1.

Firstly, referring to FIG. 4, the first guiding portion 15 of the first mold part 10 is inserted into the bushing 30, and the bushing 30 is supported on the first supporting surface 110.

Figure 5:
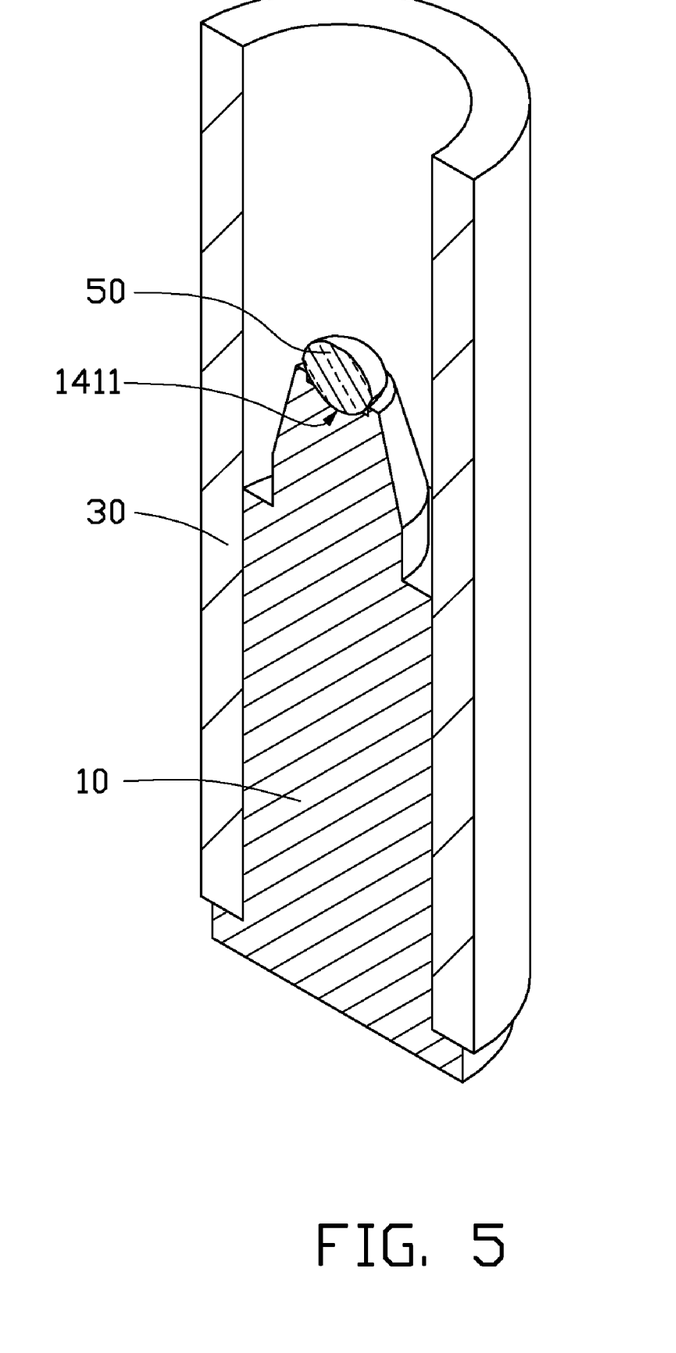

Secondly, referring to FIG. 5, a glass preform 50 is placed on the first molding surface 1411 of the first mold part 10 by a mechanical arm (not shown) or suction devices.

Figure 6:
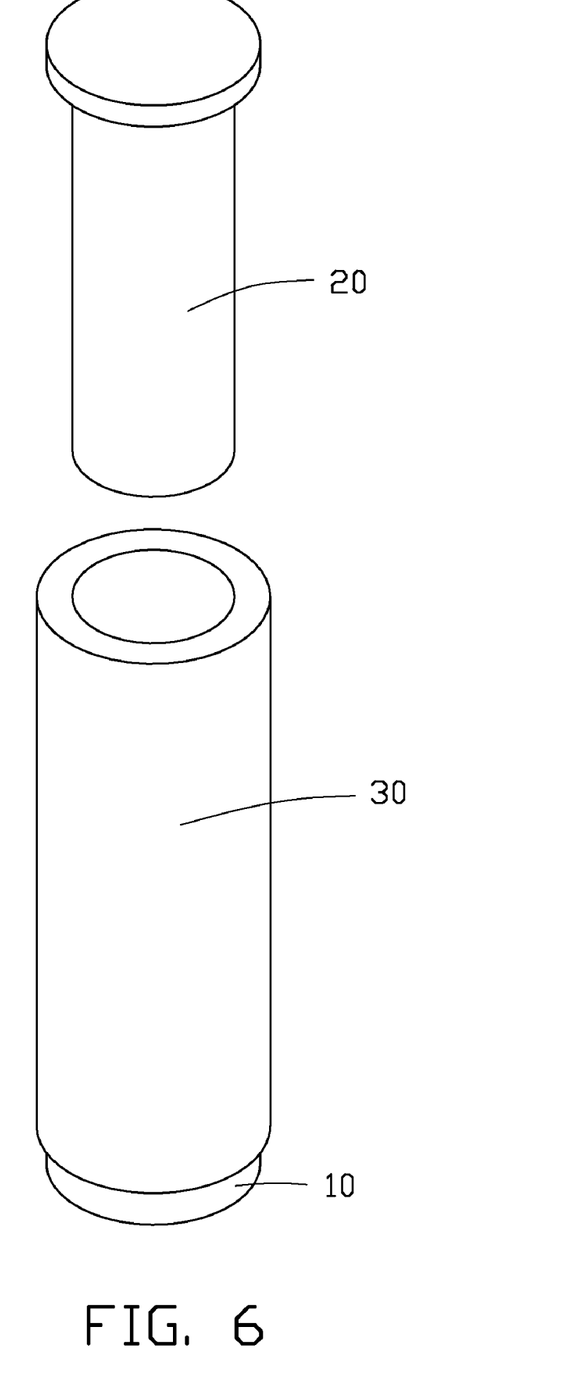
Figure 7:
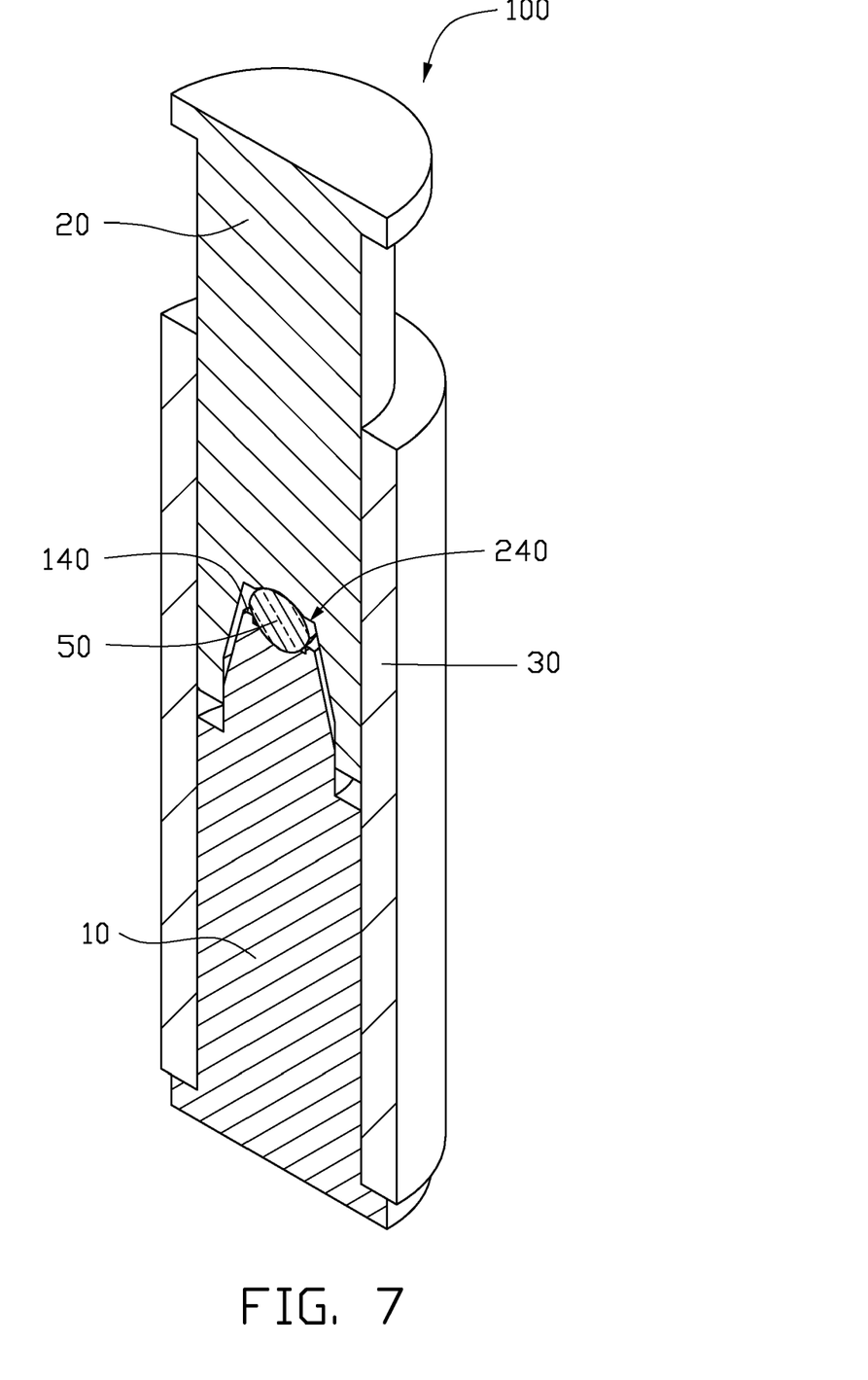

Thirdly, referring to FIGS. 6 and 7, the second mold part 20 is inserted into the bushing 30, in a manner that the second molding surface 2410 faces the first molding surface 1411.

Fourthly, the glass preform 50 is heated and pressed, thereby obtaining a desired glass lens (not shown). When the first guiding portion 15 inserts into the guiding chamber 25, the frustoconical body 14 of the first guiding portion 15 is firstly inserted into the first guiding chamber 251, then the rest of the first guiding portion 15 is guided into the guiding chamber 25 until the periphery portion 240 of the guiding chamber 25 wholly contacts the resist surface 140 of the frustoconical body 14. That is, when the mold 100 is in a closed state, the periphery portion 240 of the guiding chamber 25 is wholly contacting the resist surface 140 of the frustoconical body 14, and the end surface 220 is wholly contacting the end face 120 (see FIG. 1). Therefore, in the process of pressing the glass preform 50, the first mold part 10 and the second mold part 20 can obtain a low discrepancy between the positions of the first guiding portion 15 and the first guiding chamber 251, giving a high concentricity to the final product.

Finally, after being cooled and de-molding, a predetermined glass lens is obtained.

The obtained glass lens has a first surface and a second surface (not shown). The first surface of the glass lens is formed by the first molding surface 1411 of the first mold part 10, and the second surface of the glass lens is formed by the second molding surface 2410 of the second mold part 20. Because of the high concentricity between the first guiding portion 15 and the guiding chamber 25, the mold 100 can also make a lot of glass lenses with high concentricity. In a condition of the satisfying eccentricity of the mold 100, excellent quality optical articles with low eccentricity or high concentricity can be manufactured.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A mold for molding a lens, comprising:
    a first mold part comprising a first base and a first main body, the first main body comprising an end face defined at one end opposite to the first base, and a guiding chamber defined in the end face of the first main body, the guiding chamber comprising a first guiding chamber and a second cylindrical guiding chamber closer to the end face of the first main body than the first guiding chamber, the first guiding chamber communicating with the second cylindrical guiding chamber, the largest diameter of the first guiding chamber being equal to the diameter of the second guiding chamber, the bottom surface of the first guiding chamber comprising a periphery portion, and a first molding surface, the periphery portion surrounding the first molding surface; and
    a second mold part aligning with and attaching to the first mold part, the second mold part comprising:
    a second main body, and
    a guiding portion protruding out from the end face of the second main body opposite to the first main body, the guiding portion comprising a guiding body and a cylinder shaped body formed with the guiding body, the cylinder shaped body being sandwiched between the guiding body and the second main body, the guiding body comprising a resist surface defined in the top surface thereof, a substantially cylindrical recess defined in the resist surface, and a second molding surface in the bottom surface of the substantially cylindrical recess, the guiding body insertable into and matingly engageable in the first guiding chamber of the first mold part, and the cylinder shaped body insertable into and matingly engageable in the second guiding chamber of the first mold part, thus aligning the first molding surface with the second molding surface.

2. The mold of claim 1, wherein the guiding body is a truncated pyramidal shaped guiding body.

3. The mold of claim 2, further comprising a bushing receiving the first mold part and the second mold part therein.

4. The mold of claim 3, wherein the first mold part and the second mold part are coaxially arranged in the bushing.

5. The mold of claim 4, wherein the first molding surface is an aspherical surface.

\* \* \* \* \*